Figure 1:
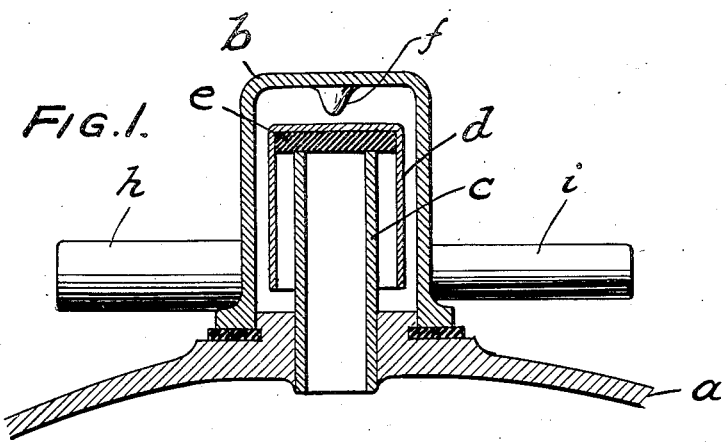

June 4, 1935. C. H. HAPGOOD 2,003,590

MILKING MACHINE CHECK VALVE CHAMBER

Filed March 2, 1933

WITNESS:
Rob R Mitchel

INVENTOR
Cyrus Howard Hapgood
BY
Russell Harding
ATTORNEYS.

Patented June 4, 1935

2,003,590

UNITED STATES PATENT OFFICE 2,003,590

MILKING MACHINE CHECK VALVE CHAMBER

Cyrus Howard Hapgood, Nutley, N. J., assignor to The De Laval Separator Company, New York, N. Y., a corporation of New Jersey Application March 2, 1933, Serial No. 659,298

4 Claims. (Cl. 31—62)

My invention relates to milking machines wherein a milk pail is maintained under partial vacuum and has for its object to provide a check valve construction which will effectually prevent the passage, from the piping to the pail, of water or vapor, or the back flow of air, any of which may be contaminated with bacteria.

A preferred embodiment of the invention is shown in the drawing, wherein—

Figure 2:
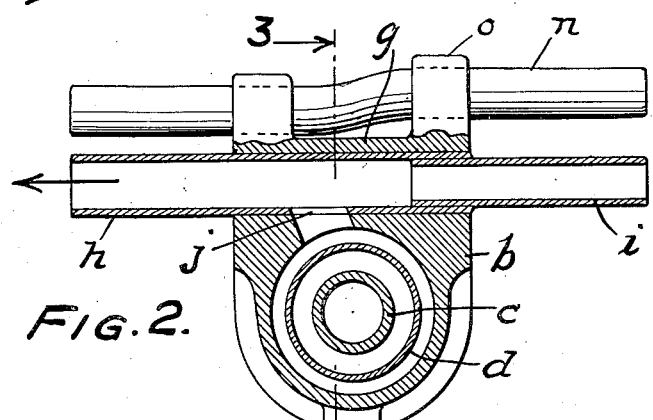
Figure 3:
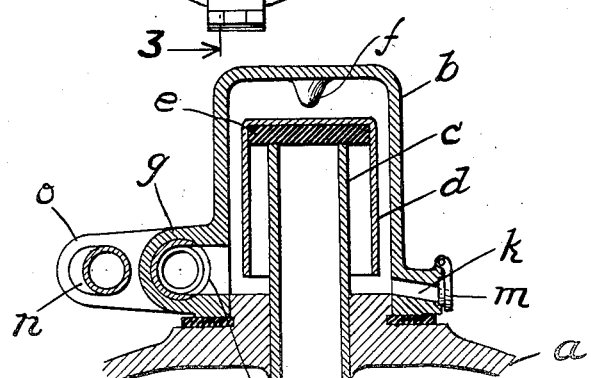

Fig. 1 is a vertical sectional view through the check valve structure and its connection with the milk pail and vacuum pipe. Fig. 2 is a horizontal section through the check valve chamber and the vacuum pipe communicating therewith. Fig. 3 is a vertical section on the line 3—3 of Fig. 2.

Mounted on the top $a$ of the pail is a dome-shaped casing $b$ forming, with the central part of the pail top, a check valve chamber. Into an orifice in the center of the pail top is inserted a tube $c$, which extends up a considerable distance into the casing $b$. Resting on the top of the tube $c$ is the base of the check valve, which has the form of an inverted cup $d$, the depending skirt of which surrounds the tube $c$ and terminates above the bottom of the check valve chamber. The base of the cup is lined interiorly with a washer $e$ of rubber or other suitable flexible material adapted to make good contact with the upper edge of the tube. Depending from the roof of the check valve chamber is a teat or stop $f$ adapted to limit the upward movement of the check valve when it unseats.

The wall of the check valve casing is shaped to form an open-ended tubular socket $g$ into which extends and closely fits one section of a vacuum pipe $h$ which communicates with a source of suction. Into the end of pipe section $h$ more remote from the source of suction extends and closely fits one end of another section $i$ of the vacuum pipe, the outside diameter of $i$ being the same as the inside diameter of $h$. The vacuum pipe and the wall of the casing $b$ are provided with aligning openings $j$. It will be observed that the vacuum pipe thus communicates with the lower part of the check valve chamber, so that air is withdrawn from the check valve chamber at a level coinciding with the bottom of the valve chamber. It will be observed that the tubes $i$ and $h$ in relation to opening $j$ form, in effect, an ejector.

I have not shown the connection between the cups and the milk pail through which the milk is conveyed, since this connection is well known in the art.

In operation, the vacuum pipe section $h$ is connected with suction and air is exhausted from the pail through tube $c$, chamber $b$ and ports $j$, the check valve $d$ being unseated until the absolute pressures in the vacuum pipe and in the pail are equalized. The vacuum pipe section $i$ is connected with the teat cups through the vacuum chamber of an udder pulsator.

During the operation of milking there is a continuous flow of air through the vacuum pipe, which due to its differential diameter adjacent the valve chamber, acts as an ejector so as to neutralize any tendency otherwise for such air to backflow into the valve chamber. Any moisture from the udder pulsator, such as wash water lodged in the inflation spaces of the teat cups, or condensed moisture or milk from a broken liner, flows from pipe section $i$ to pipe section $h$ and not into the check valve chamber, as in previous constructions. If, for any reason, any water or milk should enter the valve chamber, or be condensed therein, it will settle into the bottom thereof and will be automatically withdrawn through the drain port $k$ (normally closed by check valve $m$) when, after the check valve chamber is disconnected from vacuum, the pressure therein rises to normal.

The tube $n$, extending parallel to the vacuum pipe $h$, $i$ and supported by projections $o$ on the valve casing $b$ is adapted for connection at opposite ends to rubber tubes, providing a conduit for transmission of pneumatic pulsations from a primary pulsator (not shown) to an udder pulsator (not shown).

What I claim and desire to protect by Letters Patent is:

1. In a milking machine, the combination with the milk pail, a tube communicating with the interior of the pail and extending above the top thereof, a casing over the milk pail top and enclosing and spaced from the tube and forming a valve chamber, and a check valve resting on the top of the tube and having a skirt depending therefrom spaced both from the tube and the wall of the casing, of means providing a vacuum passage extending alongside said valve chamber, there being through the wall of the casing an opening through which said passage communicates with the valve chamber, said passage being contracted adjacent said opening to produce an ejector effect substantially as described.

2. In a milking machine, the combination with the milk pail, a tube communicating with the interior of the pail and extending above the top thereof, a casing over the milk pail top and enclosing and spaced from the tube and forming a valve chamber, and a check valve resting on the top of the tube and having a skirt depending therefrom spaced both from the tube and the wall of the casing, of means providing a vacuum passage extending alongside said valve chamber, said passage having adjacent, relatively expanded and contracted sections, there being an opening between said expanded section and the interior of the valve chamber below the top of said tube.

3. In a milking machine, the combination with the milk pail, a tube communicating with the interior of the pail and extending above the top thereof, a casing over the milk pail top and enclosing and spaced from the tube and forming a valve chamber, and a check valve resting on the top of the tube and having a skirt depending therefrom spaced both from the tube and the wall of the casing, of means providing a continuous vacuum passage extending uninterruptedly alongside the casing, there being a port opening laterally from said passage to said valve chamber and establishing communication between the side wall of the vacuum passage and the interior of the casing at a level below the top of the tube.

4. In a milking machine, the combination with the pail, a tube communicating with the interior of the pail and extending above the top thereof, a casing over the milk pail top and enclosing and spaced from the tube and forming a valve chamber, and a check valve resting on the top of the tube and having a skirt depending therefrom spaced both from the tube and the wall of the casing, a tubular socket, open at opposite ends, formed by the casing wall and extending laterally from the main body thereof, and a vacuum pipe engaging said socket and providing a continuous fluid passage, there being registering ports in the casing wall and vacuum pipe wall through which air is withdrawn from the check valve chamber into the vacuum pipe.

CYRUS HOWARD HAPGOOD.